United States Patent
Faraj

(10) Patent No.: US 9,720,795 B2
(45) Date of Patent: Aug. 1, 2017

(54) PERFORMANCE REGRESSION MANAGER FOR LARGE SCALE SYSTEMS

(71) Applicant: International Business Machines Corporation, Armonk, NY (US)

(72) Inventor: Daniel A. Faraj, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 353 days.

(21) Appl. No.: 14/081,840

(22) Filed: Nov. 15, 2013

(65) Prior Publication Data

US 2015/0113509 A1    Apr. 23, 2015

Related U.S. Application Data

(63) Continuation of application No. 14/057,036, filed on Oct. 18, 2013.

(51) Int. Cl.
*G06F 11/30* (2006.01)
*G06F 11/32* (2006.01)
(Continued)

(52) U.S. Cl.
CPC ...... *G06F 11/3428* (2013.01); *G06F 9/44526* (2013.01); *G06F 11/079* (2013.01);
(Continued)

(58) Field of Classification Search
CPC ............. G06F 9/44526; G06F 11/3428; G06F 11/079; G06F 11/3409; G06F 11/3692;
(Continued)

(56) References Cited

U.S. PATENT DOCUMENTS 5,421,004 A     5/1995  Carpenter et al.
5,684,947 A  *  11/1997  Horie .................. G06F 11/3495
                                                          714/37
(Continued)

OTHER PUBLICATIONS

Helsinger, A., et al., Tools and techniques for performance measurement of large distributed multiagent systems, Proceedings of the second international joint conference on Autonomous agents and multiagent systems, Jul. 14-18, 2003, pp. 843-850, [retrieved on Mar. 15, 2017], Retrieved from the Internet: <URL:http://dl.acm.org/>.*

(Continued)

*Primary Examiner* — Geoffrey St Leger
(74) *Attorney, Agent, or Firm* — Patterson + Sheridan, LLP

(57) ABSTRACT

System and computer program product to perform an operation comprising generating, based on a first output generated by a first execution instance of a command, a first output file specifying a value of at least one performance metric, wherein the first output file is formatted according to a predefined format, comparing the value of the at least one performance metric in the first output file to a value of the performance metric in a second output file, the second output file having been generated based on a second output generated by a second execution instance of the command, and outputting for display an indication of a result of the comparison of the value of the at least one performance metric of the first output file to the value of the at least one performance metric of the second output file.

19 Claims, 11 Drawing Sheets

(51) Int. Cl.
  *G06F 11/34* (2006.01)
  *G06F 11/36* (2006.01)
  *G06F 9/445* (2006.01)
  *G06F 11/07* (2006.01)

(52) U.S. Cl.
  CPC .......... *G06F 11/32* (2013.01); *G06F 11/3409* (2013.01); *G06F 11/3452* (2013.01); *G06F 11/3692* (2013.01); *G06F 11/3065* (2013.01); *G06F 11/3476* (2013.01); *G06F 11/3495* (2013.01)

(58) Field of Classification Search
  CPC .. G06F 11/32; G06F 11/3452; G06F 11/3065; G06F 11/3476; G06F 11/3495
  See application file for complete search history.

(56) References Cited

U.S. PATENT DOCUMENTS

| | | | | |
|---|---|---|---|---|
| 6,128,628 | A * | 10/2000 | Waclawski | G06F 11/32 |
| 6,892,236 | B1 * | 5/2005 | Conrad | G06F 11/3409 |
| | | | | 709/203 |
| 7,162,390 | B2 * | 1/2007 | Jowett | G06F 11/3616 |
| | | | | 702/182 |
| 8,296,457 | B2 * | 10/2012 | Archer | H04L 45/00 |
| | | | | 705/1.1 |
| 8,307,328 | B1 * | 11/2012 | Portal | G06F 8/30 |
| | | | | 717/105 |
| 8,365,184 | B2 * | 1/2013 | Carter | G06F 11/3419 |
| | | | | 702/182 |
| 8,477,653 | B2 | 7/2013 | Westerberg et al. | |
| 8,583,728 | B2 * | 11/2013 | Irwin | G06F 19/322 |
| | | | | 709/203 |
| 8,958,438 | B2 * | 2/2015 | Figura | H04L 43/08 |
| | | | | 370/465 |
| 2005/0166094 | A1 | 7/2005 | Blackwell et al. | |
| 2006/0161387 | A1 * | 7/2006 | Jowett | G06F 11/3616 |
| | | | | 702/182 |
| 2006/0215575 | A1 | 9/2006 | Horton et al. | |
| 2008/0027961 | A1 * | 1/2008 | Arlitt | G06F 11/3452 |
| 2008/0307088 | A1 * | 12/2008 | Chen | G06F 11/3495 |
| | | | | 709/224 |
| 2009/0037598 | A1 * | 2/2009 | Archer | H04L 45/00 |
| | | | | 709/238 |
| 2009/0064158 | A1 * | 3/2009 | Carter | G06F 11/3419 |
| | | | | 718/104 |
| 2011/0222432 | A1 | 9/2011 | Westerberg et al. | |
| 2011/0246565 | A1 * | 10/2011 | Irwin | G06F 19/322 |
| | | | | 709/203 |
| 2012/0185775 | A1 * | 7/2012 | Clemm | G06F 11/3409 |
| | | | | 715/734 |
| 2013/0086564 | A1 | 4/2013 | Felch | |
| 2013/0091266 | A1 * | 4/2013 | Bhave | G06F 11/3476 |
| | | | | 709/224 |
| 2013/0145205 | A1 * | 6/2013 | Lee | H04L 43/0805 |
| | | | | 714/4.1 |
| 2013/0182700 | A1 * | 7/2013 | Figura | H04L 43/08 |
| | | | | 370/352 |
| 2013/0254373 | A1 * | 9/2013 | Cockrell | G06F 11/3495 |
| | | | | 709/224 |
| 2015/0067651 | A1 * | 3/2015 | Hoffmann | G06F 11/3612 |
| | | | | 717/125 |
| 2015/0095892 | A1 * | 4/2015 | Baggott | G06F 11/3612 |
| | | | | 717/127 |

OTHER PUBLICATIONS

Spear, W., et al., Performance Tool Workflows, International Conference on Computational Science, 2008, pp. 276-285, [retrieved on Mar. 15, 2017], Retrieved from the Internet: <URL:http://link.springer.com/chapter/10.1007/978-3-540-69389-5_32>.*

Buyya, Rajkumar et al., Nimrod/G: An Architecture for a Resource Management and Scheduling System in a Global Computational Grid, HPC Asia 2000, May 14-17, 2000, pp. 283-289, Beijing, China.

Courson, Michael et al., An Automated Benchmarking Toolset. In Proceedings of the 8th International Conference on High-Performance Computing and Networking (HPCN Europe 2000), Springer-Verlag, London, United Kingdom.

Pavlo, Andrew et al., The NMI build & test laboratory: continuous integration framework for distributed computing software, Proceedings of the 20th conference on Large Installation System Administration (LISA'06), USENIX Association, Berkeley, United States.

Gomez, Raul, ClusterNumbers: An Automated Benchmarking Tool for HPC Clusters, Feb. 23, 2011, <http://www.hpcwire.com/hpcwire/2011-02-23/clusternumbers_an_automated_benchmarking_tool_for_hpc_clusters.html>.

Cuddy, Rob et al., Implementing build and release best practices with Rational Build Forge software, Build and release management: White paper, Feb. 2008, IBM, Armonk, United States.

Kalibera, Tomas et al., Automated Benchmarking and Analysis Tool, Automated benchmarking and analysis tool, Proceedings of the 1st international conference on Performance evaluation methodologies and tools (valuetools '06), ACM, New York, USA.

Mittelmann, Hans D. et al., A Server for Automated Performance Analysis and Benchmarking of Optimization Software, Optimization Online, 2003, <http://www.optimization-online.org/DB_HTML/2003/02/612.html>.

Tinderbox, Mozilla Developer Network, Mar. 4, 2013, <https://developer.mozilla.org/en-US/docs/Tinderbox>.

IBM, Automate software assembly to speed delivery and improve reliability, IBM Software, 2013, <http://www-03.ibm.com/software/products/us/en/buildforgeee>.

Smallen, Shava et al., The Inca Test Harness and Reporting Framework, Proceedings of the 2004 ACM/IEEE conference on Supercomputing, 2004, IEEE, Washington, DC, United States.

Thain, Douglas et al., Distributed Computing in Practice: The Condor Experience, 2004, Concurrency and Computation: Practice & Experience—Grid Performance, Feb. 2005, vol. 17, Issue 2-4, John Wiley and Sons Ltd., Chichester, United Kingdom.

U.S. Appl. No. 14/057,036, entitled Performance Regression Manager for Large Scale Systems, filed Oct. 18, 2013.

U.S. Appl. No. 14/065,908, entitled Performance Regression Manager for Large Scale Systems, filed Oct. 29, 2013.

* cited by examiner

| Test 201 | Metric 202 | Decision 203 | TARGET EXECUTION 204 | PERCENTAGE 205 |
|---|---|---|---|---|
| ANLBench.pingpong | "Intranode" | < | BUILD_MAY_1 | 3 % |
| ANLBench.mmps | "latency" | < | BUILD_MAY_1 | 5 % |
| ANLBench.aggregate | "ANY" | < | BUILD_MAY_1 | 8 % |
| ANLBench.pingpong.1024nodes | "Intranode" | < | BUILD_MAY_1 | 10 % |

```
#number of tables: 1
#title: "Ncde Aggregate Bandwidth"
#labels: "PPN" "BW(G3/5)"    } 211
#"PPN" "BW(GB/s)"            } 212
1  30.53
4  35.51
8  35.56
16 35.57
64 32.42
```

| Functional 311 | Performance Status 312 | Health-o-Meter 313 | Analysis 314 | Summary 315 | Cleanup 316 |

310 (brace over tabs)

Performance Status across Applications/Tests
You can click on hyperlinks for more details

| Application | Last Execution Instance | Target Execution Instance |
|---|---|---|
| ANLBench | Build_May_2 | Build_April_29 |
| | | May_1 |
| | | Build_April_30 |
| PHLOEM | Build_May_2 | Build_April_29 |
| | | Build_April_30 |
| | | Build_April_30 |

Global View — 305

306 / 307 / 308

▷ Portfolio of PMT-2.5   302
- ANLBench
- PHLOEM

▷ Guide   301

| None | Not run |
| Func | Functional failure |
| Fail | Performance failure |
| Pass | Perf. Pass with excep. |
| Pass | Performance Pass |

Applicatiion: ANLBench
Configuration: ANLBench.pingpong.Nodes_512
Execution Instance: Build_May_2
Base Execution Instance: Build_May_1

} 401

Table 403: PingPong Latency Best
Comment: No comments
Target: Build_May_1

| Msize | Intranode | Base | Threshold | Status | Exception | % age |
|---|---|---|---|---|---|---|
| 0 | 1.8463 | 1.6595 | 3 % | -11.26 % | - | - |
| 4096 | 4.4301 | 3.8995 | 3 % | -13.61 % | - | - |
| 65536 | 13.9291 | 14.0381 | 3 % | +0.78 % | - | - |

403

Table 405: PingPong Latency Best
Comment: No comments
Target: Build_May_1

| Msize | Nearest | Base | Threshold | Status | Exception | % age |
|---|---|---|---|---|---|---|
| 0 | 2.7126 | 1.8472 | 3 % | -46.85 % | - | - |
| 4096 | 7.7617 | 7.4267 | 3 % | -4.51 % | - | - |
| 65536 | 44.8709 | 43.3591 | 3 % | -3.49 % | - | - |

| PRM 912 | | | | |
|---|---|---|---|---|
| Task execution Component 1001 | User plugin component 1002 | Performance rule analyzer 1003 | Draw component 1004 | Commit Component 1005 |

FIG. 10

PERFORMANCE REGRESSION MANAGER FOR LARGE SCALE SYSTEMS

CROSS-REFERENCE TO RELATED APPLICATIONS

This application is a continuation of co-pending U.S. patent application Ser. No. 14/057,036, filed Oct. 18, 2013. The aforementioned related patent application is herein incorporated by reference in its entirety

STATEMENT REGARDING FEDERALLY SPONSORED RESEARCH OR DEVELOPMENT

This invention was made with government support under B554331 awarded by the Department of Energy. The government has certain rights in the invention.

BACKGROUND

The present disclosure relates to computer software, and more specifically, to a performance regression manager for large scale systems.

Any system (software, hardware, or both) must be tested thoroughly prior to release to ensure the highest quality and customer satisfaction. Large scale (also referred to as parallel or high performance) computing systems are no exception, requiring substantial efforts and resources due to their unique scale and features, which add dimensions and complexity to the benchmarking space, as well as the associated management and analysis of the generated data. For example, various customers may require executing different benchmarks, specific compilers, and specific libraries. These machines can run with different rack configurations, number of compute nodes, processes per node, optimizations and communication protocols, and thread levels. While automated testing frameworks have simplified the benchmarking space, they have not provided the ability to quickly and accurately manage and analyze the generated data. Furthermore, existing performance testing frameworks are specific to a given domain and can only handle metrics defined in that domain.

SUMMARY

Embodiments disclosed herein provide a system and computer program product to perform an operation comprising generating, based on a first output generated by a first execution instance of a command, a first output file specifying a value of at least one performance metric, wherein the first output file is formatted according to a predefined format, a first output file formatted according to a predefined format, comparing the value of the at least one performance metric in the first output file to a value of the performance metric in a second output file, the second output file having been generated based on a second output generated by a second execution instance of the command, and outputting for display an indication a result of the comparison of the value of the at least one performance metric of the first output file to the value of the at least one performance metric of the second output file.

BRIEF DESCRIPTION OF THE SEVERAL VIEWS OF THE DRAWINGS

FIG. 2A illustrates an example metafile, according to one embodiment.

FIG. 2B illustrates an example formatted output file, according to one embodiment.

FIGS. 3A-B illustrate example outputs of the performance regression manager for large scale systems, according to one embodiment.

FIG. 4 illustrates a comparison of metrics across multiple execution instances of a command, according to one embodiment.

FIG. 10 illustrates components of the performance regression manager (PRM) for large scale systems, according to one embodiment.

DETAILED DESCRIPTION

Figure 1:
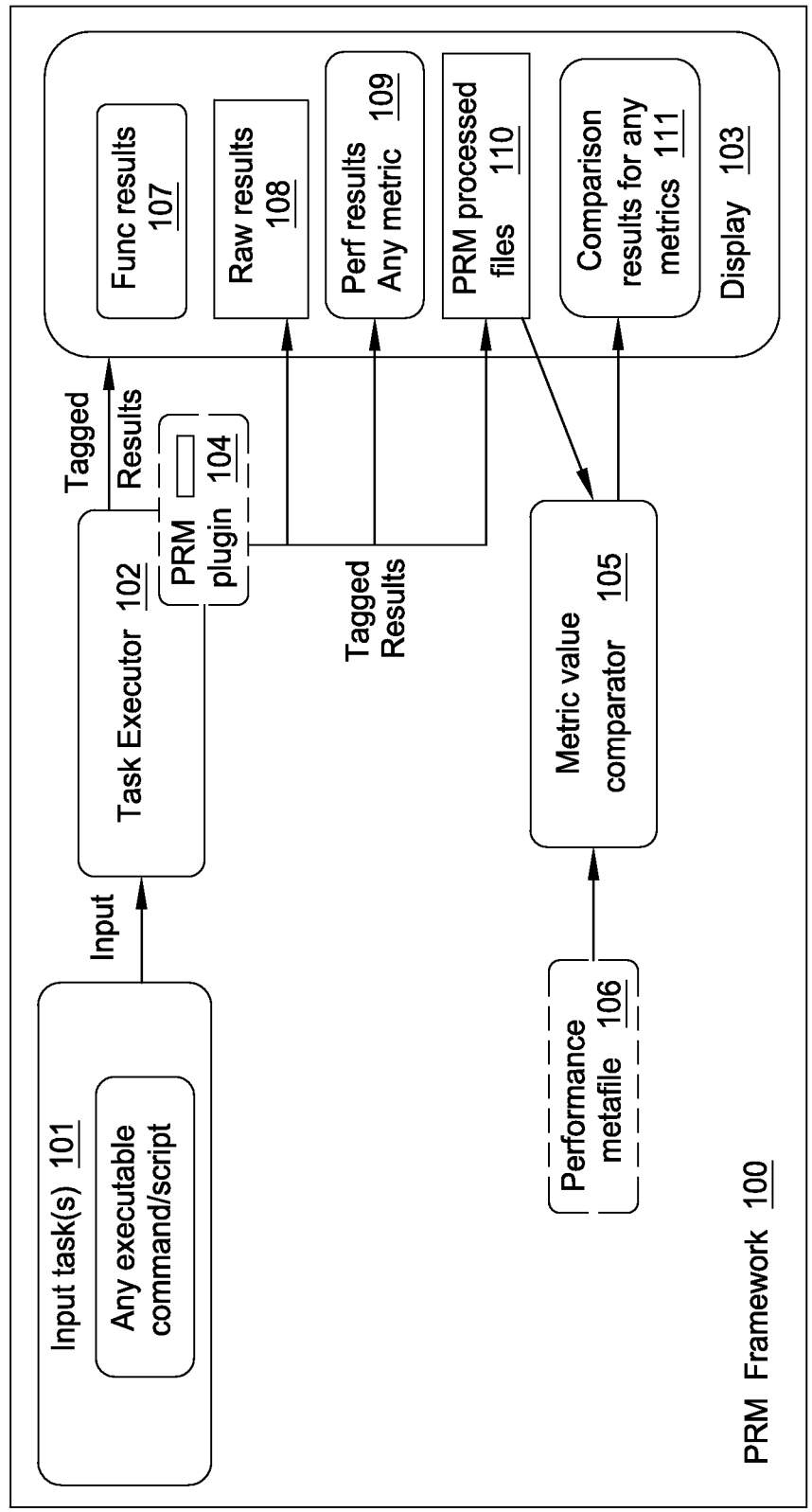
FIG. 1 illustrates a logical view of a system implementing a performance regression manager for large scale systems, according to one embodiment.

Embodiments disclosed herein provide an application performance framework that can work in any domain and for any metric, whether or not the metric is defined in the domain. The performance regression manager (PRM) can easily be integrated with existing benchmarking infrastructure to deliver flexible, functional, and performance regression tracking and analysis. The PRM framework operates across domains and able to perform analyze any user-defined metric, rather than merely supporting framework-defined metrics. In addition to indicating whether tasks execute successfully, the PRM framework allows developers to visualize performance metrics related to their tasks (generally, any executable code), providing detailed comparisons between metric values for current executions and one or more previous executions of the tasks. Additionally, metric values for previous executions may be compared to one another as part of the visualization.

The PRM framework de-couples the processes in a regression phase into three components—task execution, user plugins, and performance language and analyzer. To support any metric in any domain, PRM employs user-defined plugins that specify the metrics and ties into the existing performance framework. A user writing a plugin may specify any number of metrics of interest, and a way to extract the values for each metric from the execution output of a task. The user-defined plugin may also generate an output file in a standard PRM format (also referred to as a PRM processed file) that is used by the PRM framework for subsequent comparisons, allowing interoperability across domains and metrics. To provide multiple, efficient comparison studies on many levels of granularity across multiple data sets, PRM implements a metafile defining the metrics for analysis and specifying the data sets that should be compared. The PRM framework may output notifications as to whether specific tasks are executed successfully as well as analyze metric data to indicate whether a current execution instance of a task realized increased or decreased performance as to any metric. A user may specify whether they wish to see a functional report indicating which tasks succeeded and failed, a visualization of the functional report (such as by a table, plot, or other format), and a visualization of the result of the performance comparisons.

Generally, PRM takes, as input, a command, script, or process. An example task includes a plurality of commands used to test a particular configuration of a large scale computing system. PRM executes the command, script or process, and generates output that is displayed to the standard out/error with a copy saved into an internal PRM database. PRM may issue commands concurrently on various resources. For example, PRM may run multiple tests on different hardware allocations of a large scale system. The command itself may identify a particular configuration for executing the test operation. PRM may then examine the output generated by executing each command to determine whether the command executed successfully and whether performance metrics were met. After the command executes, PRM invokes the user-defined plugin to extract the metric values for each metric and generate the PRM processed files. PRM may then use the PRM processed files to allow for comparisons across two or more data sets using rules defined in the metafiles.

PRM includes tools for testing and analyzing the performance of a large scale computing system. For example, PRM may include a draw tool to provide visualizations to from a processed output file. PRM may also include a tool for comparing execution instances of a specific benchmarking space, a tool for summarizing one or more execution instances and create a performance summary across all common configurations, and a tool for transforming raw data into a well-organized format and carrying out internal processes for creating first-time comparisons.

While embodiments disclosed herein are discussed using large scale computing systems as a reference example, the techniques are equally applicable across any type of software testing platform, where the need to track functional and performance regression/progression of any quantifiable concept or metric is required. The use of large-scale systems is for illustrative purposes only, and should not be considered limiting of the disclosure.

FIG. 1 illustrates a logical view of a performance regression manager (PRM) framework 100 for large scale systems, according to one embodiment. As shown, the PRM framework 100 includes one or more input tasks 101 that a user provides as input to a task executor 102. The input tasks 101 may be any command, script, or process, and may be a simple command (e.g., mpirun), a complex command made up of multiple commands, or a script of varying complexity. Example commands may include operations used to test a particular configuration of a high performance computing system. The task executor 102 executes the input tasks 101 and generates tagged output that is displayed to a standard out/error (not shown) of the display 103, and saves a copy of the output as functional results 107 and raw results 108. The task executor 102 tags the output of each execution instance with a unique identifier, and uses the unique identifier to place the functional results 107 and raw results 108 in a directory associated with each unique identifier. Generally, a given input task configuration 101 corresponds to a single unique task in the testing space. For example, bcast.integers.1024nodes indicates a task that performs a broadcast operation of integers on 1024 compute nodes in a large scale system. Given that tasks are unique, as are their labels, in at least some embodiments, this attribute may be used to create a directory structure storing the output of a given task. For example, the corresponding directory for the above task may be raw/bcast/integers/1024nodes. An example directory structure for PRM may include subfolders for tools, raw, web, analysis, and summaries, with directories for each execution instance of an input task 101.

Once the task executor 102 executes the input tasks 101, the PRM framework 100 may display an indication whether the input tasks 101 completed successfully. For example, the task executor 102 may invoke the grep utility on the output results 107 to find pass/fail strings (such as PRM_SUCCESS, PRM_FAILURE, and PRM_RETRY). In embodiments where the PRM framework 100 is part of a large scale computing system, if the task execution failed, the task executor 102 may gather core files (containing error/debug information), tar the core files, and create a call stack leading to the violating problems. This additional information may be stored in the raw directory for each command, allowing users to gather information in case of failures as well as have such information centrally accessible, facilitating a diagnosis of the problem.

Generally, the PRM plugin 104 is a user-supplied plugin that specifies any performance metric that the user wishes to monitor across multiple execution instances of each input task 101 and an output format for the PRM processed files 110. The PRM plugin 104 processes the raw results 108 of the task executor 102 to identify values for each performance metric specified in the plugin and generate, as output, the performance results for any metric 109 arranged in PRM appropriate format, which will be stored in PRM processed files 110. In one embodiment, the PRM processed files 110 are formatted as a table including an identifier for each task and the value for each respective performance metric for the task. In one embodiment, prior to generating performance results, the PRM plugin 104 determines whether the task executor 102 successfully executed the command, or whether execution failed.

FIG. 2B depicts a sample PRM processed file 210, according to one embodiment. The PRM processed file 210 includes a comments section 211 specifying the number of tables, a title of "Node Aggregate Bandwidth," and a label for each column in the table 212. As shown, the first column is a "PPN," or project program number, and the second column is "BW (BG/s)," or bandwidth in gigabytes per second. The table 212 shows that for project program number 1, the bandwidth was 30.53 gigabytes per second, while program numbers 4, 8, 16, and 64 experienced bandwidths of 35.51, 35.56, 35.57, and 32.42 gigabytes per second, respectively.

Returning to FIG. 1, as shown, the PRM framework 100 also includes performance metafiles 106. Generally, each performance metafile 106 is a user-generated file that specifies reusable comparison rules. The rules may be blanket rules, applying to all task execution configurations tagged with a specific execution instance or task-specific rules that apply to a subset of tasks, allowing for customized comparisons. In one embodiment, the performance metafile 106 may include a given configuration, data points for comparison, a logical operator, a base instance (a prior execution instance of a task), a percentage, and an annotation. For example, the performance metafile 106 may specify that the current execution instance of the input tasks 101 must have a bandwidth metric that exceeds the bandwidth of two prior execution instances by 10% in order to be considered "passing." Therefore, if the bandwidth of the current execution instance of the input tasks 101 does not exceed the bandwidth values for the prior two execution instances by more than 10%, the PRM framework 100 may indicate in the comparison results 111 that the current execution instance failed to reach its performance targets.

FIG. 2A illustrates an example performance metafile 200, according to one embodiment. An example benchmark called ANLBench may have five testing tasks, namely: (i) execute an aggregate test on 512 compute nodes, (ii) execute a bisection test on 512 nodes, (iii) execute a collectives test on 512 nodes, (iv) execute an mmps test on 512 nodes, and (v) execute a pingpong test on 512 nodes. The number of nodes is for illustrative, as the tests can be executed on any number of nodes, each with a different and unique test configuration (and corresponding task identifier, such as BUILD_MAY_1_1024NODES of ANLBench.pingpong.1024nodes). As shown, the example performance metafile 200 includes a test configuration 201, a metric 202 being compared, a decision logical operator 203, a target execution 204, (a prior execution instance of a task), and a percentage threshold 205. In one embodiment, the performance metafile 200 also includes an annotation column (not pictured). Assuming the above tests were previously executed using an execution tag "BUILD_MAY_1," the performance metafile may be configured as depicted in FIG. 2A. The execution tag may be any unique identifier, which, in this example, refers to a build that was executed on May $1^{st}$. The test 201 specifies a specific test/task, such as ANLBench.aggregate. The metric 202 specifies a particular metric of interest—such as "latency" or a catchall "ANY," which monitors all metrics.

The decision logical operator 203 specifies a logical operator used in comparing the metric values for each data set. While all decision logical operators 203 are depicted as having less than values, any acceptable operator, such as "<", ">", "=", "≥", and "≤" may be specified. A target execution 204 specifies the target execution that a current execution instance is compared against, such as BUILD_MAY_1. A percentage 205 specifies a comparison threshold used to determine whether or not the performance metrics of the current execution instance pass or fail the performance requirements. For example, the percentage 205 for the latency metric of ANLBench.mmps is 5%. Therefore, if the latency values of the current execution instance exceed the latency values of target execution 204 BUILD_MAY_1 (its values also stored a respective PRM processed file 110) by 5%, the condition fails for the current execution instance, i.e., the latency of the current execution instance did not improve more than 5% over the latency of BUILD_MAY_1.

Figure 3A:
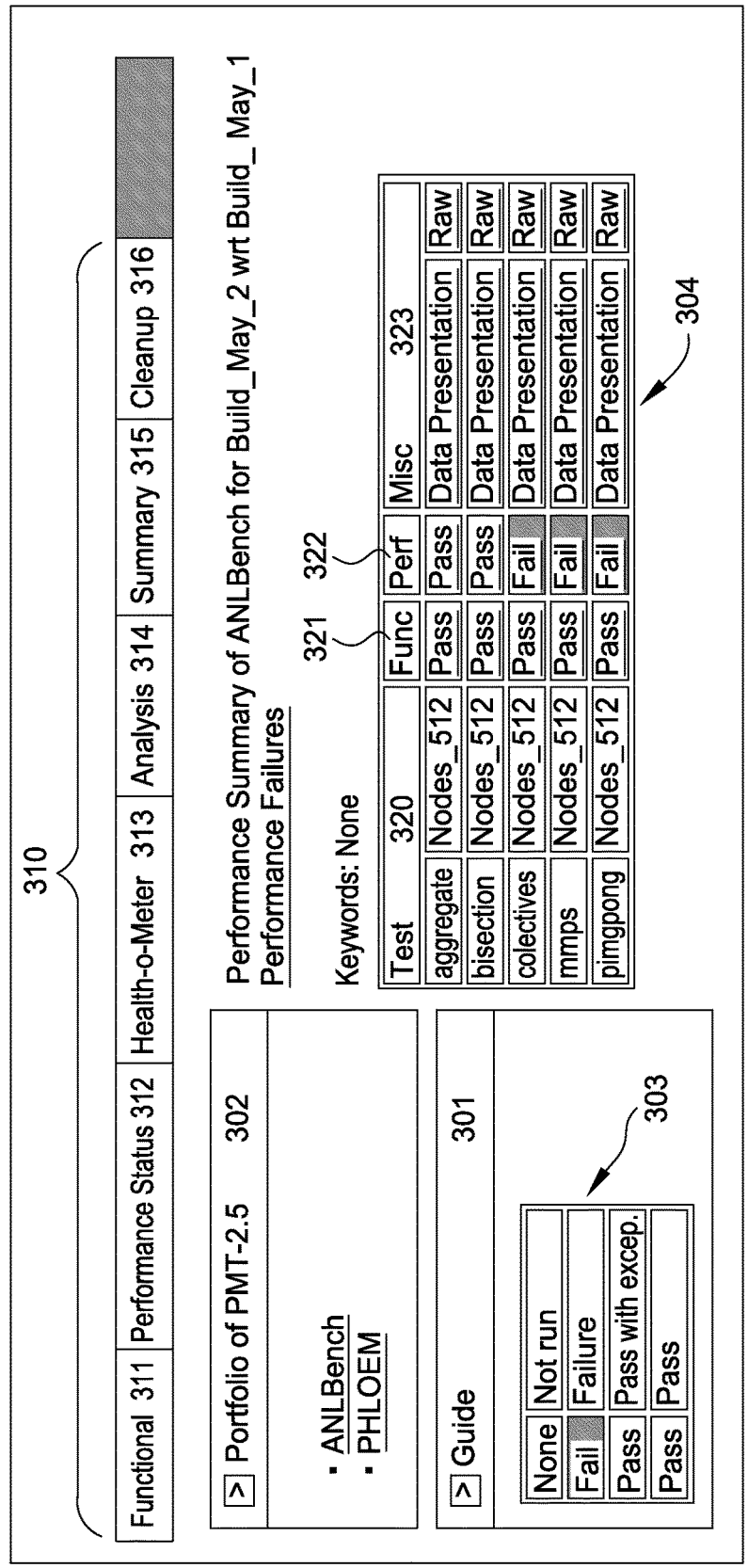

Returning again to FIG. 1, a metric value comparator 105 applies the rules in the performance metafile 106 to two or more PRM processed files 110 in order to generate comparison results 111 for any performance metric. FIGS. 3A-B and FIG. 4 depict example comparison results 111. Generally, the metric value comparator 105 compares the performance metric values in the PRM processed files 110 (for a current execution instance of the input tasks 101) to the performance metric values of prior execution instances specified in the performance metafile 106. Stated differently, given two execution instances of a specific benchmarking space, the metric value comparator 105 performs point-to-point comparison across all generated data points that are of interest to the user. The metric value comparator 105 analyzes the differences between data points, and annotates them with information relative to the target (such as a current execution instance) data or base (such as a first execution instance) data. For example, the annotation may be passing, failing, or approaching target. The annotation may also include the percentage by which the current execution instance's data is passing, failing, or approaching the target number. These annotations may be used to display improvement, degradation, and/or warnings about the data associated with a current execution instance.

In some embodiments, a first time comparison may be invoked in order to assure that the comparison rules in the performance metafile 105 have been established. After the initial comparison, users can invoke an on-demand comparison between two or more execution instances, resulting in on-the-fly generation of performance analyses between the execution instances. For users only requesting functionality objectives (i.e., whether the tasks executed successfully or not), a comparison of the PRM processed files 110 to the metafile 106 is not necessary, as these users are not requesting performance results.

FIG. 3A illustrates example an example display output 300 of the performance regression manager for large scale systems, according to one embodiment. Generally, FIG. 3A depicts a graphical user interface presenting results of running testing tasks for a specified benchmark. As shown, the display output 300 includes a guide section 301 which includes a table 303 which is a legend to indicate whether a task was not run, a task failed to execute, a task failed one or more performance metric tests, a task passed performance tests with exceptions, or passed the performance test. A portfolio 302 indicates which tests are currently being compared. The guide 301 includes a legend table 303 which indicates whether a task was not run, the task passed performance tests, passed with exceptions, or failed the performance test. As shown, the table 304 depicts a performance summary of the ANLBench application for current execution instance BUILD_MAY_2 with respect to a previous execution instance BUILD_MAY_1. The test column 320 indicates the tasks making up part of the ANLBench, which, as previously described, include the aggregate, bisection, collectives, mmps, and pinpong tasks, each executed on 512 nodes. The functional column 321 indicates whether the task executed successfully, which, as shown in this example, all tasks executed successfully. The performance column 322 indicates whether the BUILD_MAY_2 execution instance passed, passed with exceptions, or failed the performance test as compared to the previous execution instance of BUILD_MAY_1. As shown, the aggregate and bisection tasks passed the performance metric tests, while the collectives, mmps, and pingpong tasks failed. The miscellaneous section 323 allows users to click on a data presentation of the metric comparison or a raw data output of the task execution.

The output 300 also includes a navigation bar 310 which allows users to select functional results 311, performance status 312, a Health-o-Meter 313, analysis 314, summary 315 (selected and displayed as part of table 305), and a cleanup 316. The functional results 311 indicate whether the application execution instances executed successfully. The Health-o-Meter 313 displays a page containing a percentage measurement for the number of successful executions of tasks, functionality wise and performance wise, out of the total executed tasks for a given execution instance. The Analysis 314 page provides on-demand and on the fly capability to conduct performance comparisons on different metrics with user desired percentages (or thresholds) across two execution instances for one or more tasks. Generally, the summary tab 315 (depicted as table 304) summarizes one or more execution instances, and provides a performance summary across all common configurations. Users may pass filters (parts of configuration labels), and the tool may create a summary for a subset of configurations. In addition, users may use the summary tool 315 for scalability studies (by selecting number of nodes as a filtering option). The cleanup page provides a utility to perform soft or hard erasing of all relevant data associated with an execution instance. In soft mode, users may select an execution instance to be removed from the views or displays of the PRM pages. All relevant data, however, is still stored in PRM internal database. In hard mode, a selected execution instance marked for deletion will be removed from the views as well as PRM internal database. The cleanup also provides option to use wild card to remove subset data relevant to one or more execution tasks under a given execution instance. The table 304 may also be stored as part of a PDF file, and may also be published to a web site for other users to view and analyze.

FIG. 3B illustrates example an example display output 300 of the performance regression manager for large scale systems, according to one embodiment. Generally, output 300 is a graphical user interface depicting the results of comparisons for two benchmarks (or tasks) between a current dataset (generated by the current execution instance) with three other datasets (generated by previous execution instances). In one embodiment, the output 300 reflects the performance status 312 of the BUILD_MAY_2 execution instance. As shown, the results table 305 includes a list of applications 306, a last (or current) execution instance identifier 307, and a target (or previous) execution instances 308. As shown, the application ANLBench has three target execution instances 308, namely a BUILD_APRIL_29, BUILD_MAY_1, and BUILD_APRIL_30. The PRM framework compares the performance of the current execution instance 307 BUILD_MAY_2 to each of these target execution instances 308, and generates the table 305 to indicate whether current execution instance 307 met performance expectations. As shown, the shading indicates that the performance of BUILD_MAY_2 failed performance tests as compared to BUILD_APRIL_29, BUILD_MAY_1, and BUILD_APRIL_30. For the PHLOEM application, current execution instance 307 also failed performance tests relative to previous execution instances BUILD_APRIL_29, BUILD_MAY_1, BUILD_APRIL_30 REQ, BUILD_APRIL_30 TRGT. The table 305 may also be stored as part of a PDF file, and may also be published to a web site for other users to view and analyze.

FIG. 4 is a schematic 400 illustrating a comparison of metrics across multiple execution instances of a command, according to one embodiment. Generally, FIG. 4 illustrates sample performance comparisons between two data sets for a pingpong latency test. As shown in application details 401, the application is again ANLBench, with a configuration of ANLBench.pingpong.Nodes_512 (pingpong task executing on 512 compute nodes), an execution instance of BUILD_MAY_2 (the current execution instance), and the base (or previous) execution instance that BUILD_MAY_2 is compared against, namely BUILD_MAY_1.

As shown, the table 403 includes a comparison of the intranode metric for the two execution instances, BUILD_MAY_2 and BUILD_MAY_1. An Msize 410 indicates a message size. The intranode metric 411 indicates the intranode latency metric value for the BUILD_MAY_2 execution instance. The base 412 indicates the intranode latency metric value for the BUILD_MAY_1 execution instance for each row. The threshold 413 indicates the acceptable performance threshold, which in each case is 3%. A status 414 indicates a result of the comparison. For example, for Msize 0, the intranode latency value for BUILD_MAY_2 is 1.8463, while the base value for BUILD_MAY_1 is 1.6595. Therefore, the latency metric 411 for BUILD_MAY_2, as shown in status 414, was 11.26% lower than that of BUILD_MAY_1, a failing score. On the other hand, the Msize 65536 had an intranode latency metric 411 value of 13.9291, while the base 412 latency value was 14.0381. Therefore, the status 414 reflects a percentage improvement of 0.78%, which may be considered either trigger a pass, or pass with exceptions, depending on the comparison operator used to implement the 3% percentage threshold. The exception column 415 is used to show whether execution of the comparison returned any results that have been found and indicated by users previously to be acceptable exceptions not to be marked as performance degradation in future execution instances. The percentage column 416 is used to show how close or far is the value from the current execution instance to the value specified by the exception.

Table 405, as shown, is presents the comparison of performance results for the "nearest" metric 411 of execution instance BUILD_MAY_2 against execution instance BUILD_MAY_1. Again, for each Msize, a nearest metric 411 for execution instance BUILD_MAY_2 is compared the base 412 nearest metric of BUILD_MAY_1. As in table 403, the threshold 413 is 3%. However, in table 405, the status column 414 indicates that BUILD_MAY_2 failed each performance test, as the "nearest" metric values 411 exceeded the 3% threshold of column 413. As shown, for example, for Msize 0, BUILD_MAY_2 had a nearest metric 411 value of 2.7126, while the base 412 nearest metric value was 1.8472, meaning that the nearest metric value was for BUILD_MAY_2 46.85% worse than the nearest metric value for BUILD_MAY_1. Generally, the comparison results of any metric may be shown in tables such as the tables 403 and 405.

Figure 5:
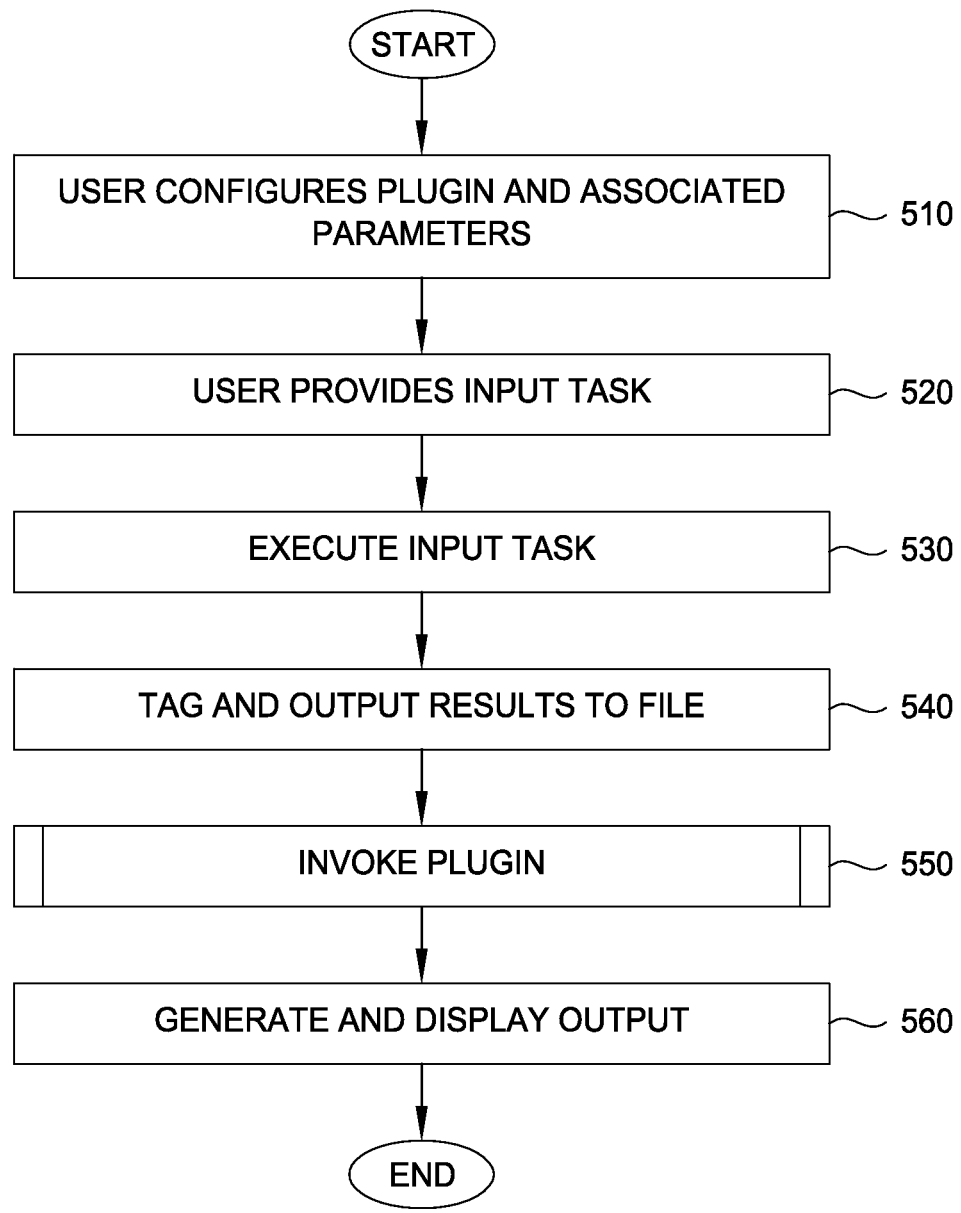
FIG. 5 illustrates a method to implement a performance regression manager for large scale systems, according to one embodiment.

FIG. 5 illustrates a method 500 for a performance regression manager (PRM) for large scale systems, according to one embodiment. Generally, the steps of the method 500 allow a user to define performance metrics for a current execution instance of any type of software, which the PRM compares against previous execution instance of the software. PRM may then output a visualization of the comparison to the user. At step 510, the user configures a set of PRM plugins and any associated plugin parameters. Generally, the PRM plugins are used to process output generated by executing a task. The plugins inform the PRM system about the metric data/values to monitor, analyze, and compare. The PRM plugin may also specify a format for an output file for an analysis of the task execution. For example, the format may be a predefined tabular format, with columns corresponding to different metrics for each execution instance. The PRM framework uses the format to perform compare a current execution against past execution datasets. Users may also define additional tasks that the plugin should perform on the output data, such as visualizing the data in plots, a table, a webpage, or creating summary logs. The plugins generated by the user may be re-used with different tasks, as there is no need to create a plugin per task, allowing PRM to work in any domain by having users supply their own plugins. This also eliminates the need to change the testing framework to work in a new domain.

At step 520, the user provides an input task. The input task may be any command, script, or process. Generally, the user provides a name of the task, which by PRM uses to resolve a unique identifier for each task execution instance. PRM uses the unique identifier to create a unique structure and store the output of a given task in this unique structure. For example, PRM would take a task with the name bcast.integers.1024nodes, and resolve it to a directory of /raw/bcast/integers/1024nodes. The unique identifier is used to encapsulate results from all commands that were run, for example, at some instance of time, or some version of a stack. This unique identifier is also used to stamp all data generated from this particular execution in order to prevent future executions from overwriting old data. The input task may also include optional inputs, namely a timeout and a keyword parameter. The timeout parameter may specify the maximum allowed time for a command to execute before PRM terminates its execution. The keyword parameter is a comment field that gets associated with, and presented with a given command or task in the benchmarking space. For example, a user may like to include a compiler keyword with different tasks that run the same command in different compiler versions.

At step 530, PRM executes the input task. PRM does not interpret the commands, but instead causes them to be executed. PRM may operate in a slave or master mode. In slave mode, the output of the original command gets passed to PRM (using commands like cat or more), while in master mode, PRM is tasked with executing a command that eventually results in some output (such as mpirun). At step 540, PRM tags the output of the execution and outputs the results to a file. At this point, PRM may output an indication as to whether the various input tasks were successfully executed, or whether specific tasks failed to execute. At step 550, PRM invokes the user plugin in order to create a PRM formatted file and trigger the comparison between the current execution instance's performance metrics and the performance metrics of previous execution instances. At step 560, PRM generates and displays the output to the user. The output may include the functional results and the performance results, or any combination thereof.

Figure 6:
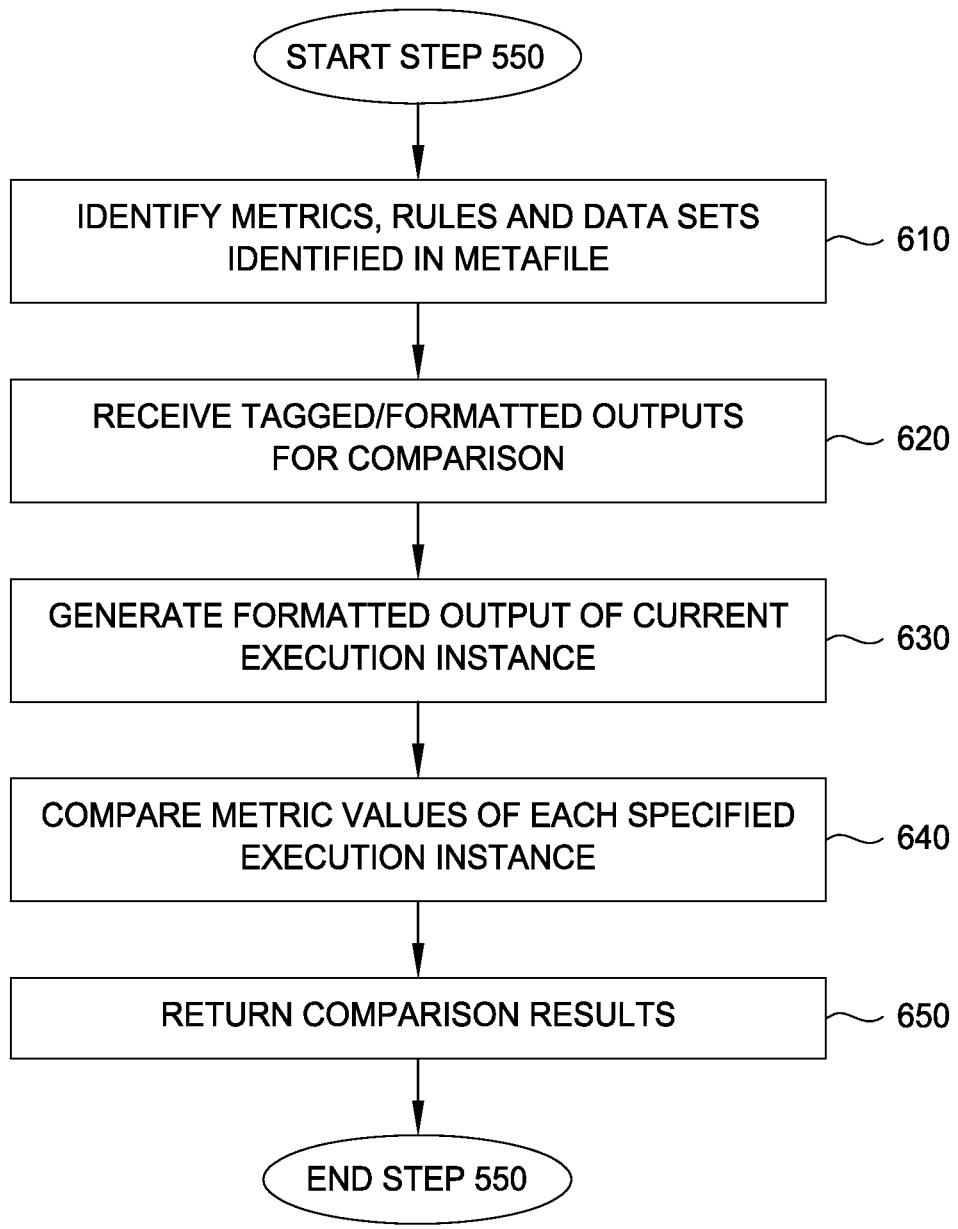
FIG. 6 illustrates a method to invoke a plugin, according to one embodiment.

FIG. 6 illustrates a method 600 corresponding to step 550 to invoke a plugin, according to one embodiment. Generally, PRM invokes the plugin in order to create, from the output file generated by executing the input tasks, a formatted file that includes metric data for the current execution instance. The plugin then triggers a comparison between the metric data in the formatted file to metric data of one or more formatted files generated by previous execution instances of the same task, or set of tasks. Once the comparison is complete, PRM may store the results in a file under the current execution directory structure, and generate one or more visualizations of the results of the comparison.

At step 610, PRM identifies the metrics, rules, and data sets identified in a metafile. The metafile may be a user-generated file that specifies reusable comparison rules. The rules may be blanket rules, applying to all task execution configurations tagged with a specific execution instance, or task-specific rules that may apply to a subset of tasks, allowing for customized comparisons. In one embodiment, the metafile may be a table specifying a given configuration, data points for comparison, a logical operator, a base instance (a prior execution instance of a task), a percentage, and an annotation. For example, the metafile may specify that the current execution instance of the input tasks must have a bandwidth metric that exceeds the bandwidth of two prior execution instances by 10% in order to be considered "passing." If the bandwidth metric values of the current instance do not exceed the bandwidth metric values of the prior execution instances by 10%, PRM may consider the current execution instance to be a failure.

At step 620, PRM receives the tagged and formatted output results specified in the metafile needed to conduct the comparison. Generally, PRM accesses the formatted results to retrieve the metric data of previous execution instances specified by the metafile to conduct the comparison. At step 630, PRM generates a formatted output for the current execution instance based on the tagged output files stored in a file at step 540 that was generated as a result of executing the input task at step 530. At step 640, PRM compares the metric values of each execution instance specified in the metafile to the current metric values in the formatted output generated at step 630. For example, the formatted output may include latency and bandwidth values for the current execution instance, while the metafile specifies that these metric values should be compared against an execution instance from one week and one month prior. In such a case, PRM may compare the bandwidth and latency values of the file generated at step 630 to the formatted files generated when the previous execution instances executed. The metafile includes the comparison rules that PRM should apply, and a threshold that must be met in order to consider performance results as passing or failing. For example, if the bandwidth value of the current execution instance must be more than 5% greater than the previous week or month's execution instance, PRM may apply this rule to the data in order to determine whether each task passes the performance tests for bandwidth and latency. At step 650, PRM returns the comparison results, which may include storing the results in a file, and may also include generating one or more visual indications of the performance results.

Figure 7:
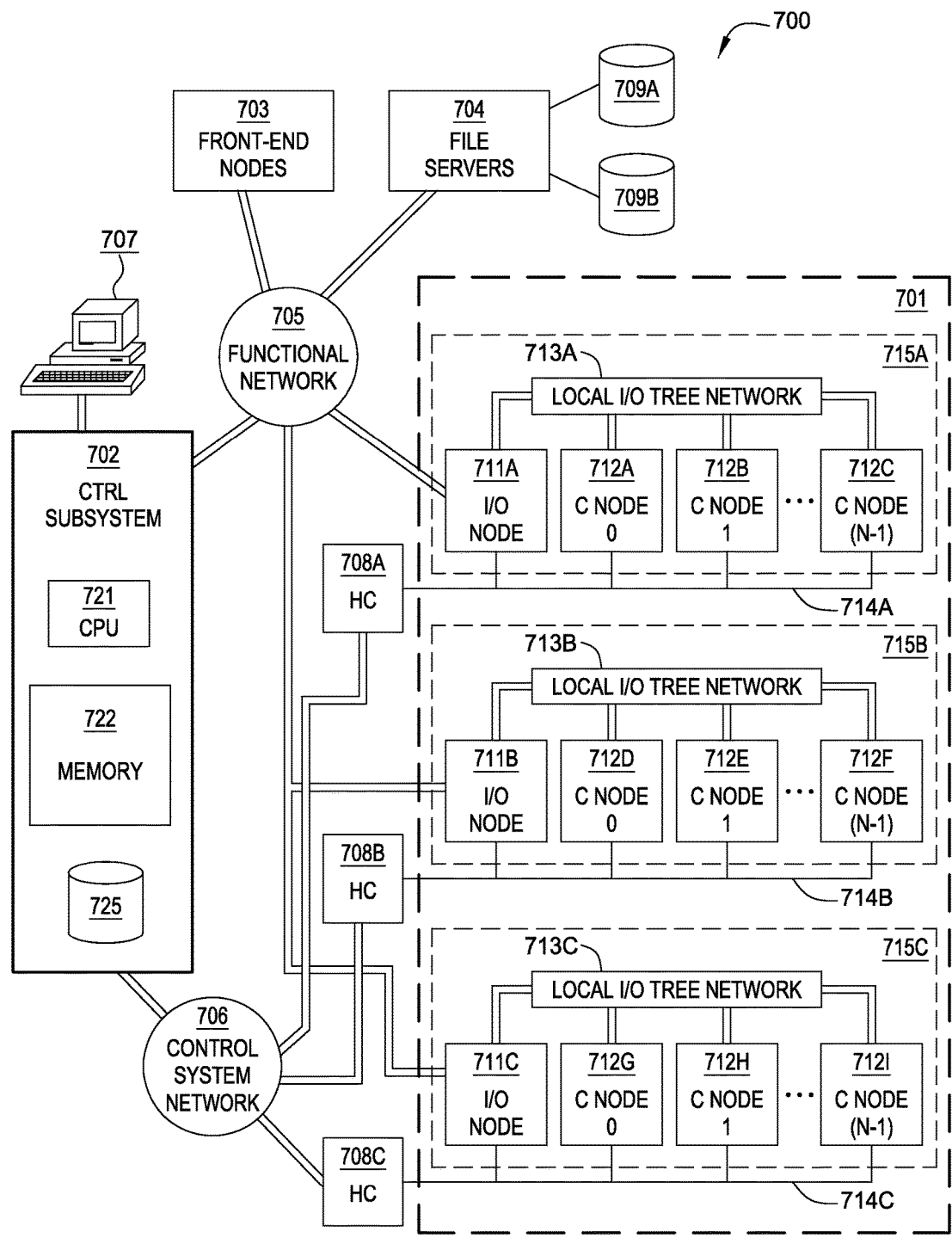
FIG. 7 is a block diagram of components of a large scale system, according to one embodiment.

FIG. 7 is a block diagram of components of a large scale computer system (also referred to as a parallel computing system, or a high performance computing system) 700, according to one embodiment of the present invention. Illustratively, computer system 700 shows the high-level architecture of an IBM Blue Gene® computer system, it being understood that other parallel computer systems could be used, and the description of a preferred embodiment herein is not intended to limit the present invention.

As shown, computer system 700 includes a compute core 701 having a number of compute nodes arranged in a regular array or matrix, which perform the useful work performed by system 700. The operation of computer system 700, including compute core 701, may be controlled by control subsystem 702. Various additional processors in front-end nodes 703 may perform auxiliary data processing functions, and file servers 704 provide an interface to data storage devices such as disk based storage 709A, 709B or other I/O (not shown). Functional network 705 provides the primary data communication path among compute core 701 and other system components. For example, data stored in storage devices attached to file servers 704 is loaded and stored to other system components through functional network 705.

Also as shown, compute core 701 includes I/O nodes 711A-C and compute nodes 712A-I. Compute nodes 712 provide the processing capacity of parallel system 700, and are configured to execute applications written for parallel processing. I/O nodes 711 handle I/O operations on behalf of compute nodes 712. Each I/O node 711 may include a processor and interface hardware that handles I/O operations for a set of N compute nodes 712, the I/O node and its respective set of N compute nodes are referred to as a Pset. Compute core 701 contains M Psets 715A-C, each including a single I/O node 711 and N compute nodes 712, for a total of M×N compute nodes 712. As an example, in one implementation M=7024 (1K) and N=64, for a total of 64K compute nodes.

In general, application programming code and other data input required by compute core 701 to execute user applications, as well as data output produced by the compute core 701, is communicated over functional network 705. The compute nodes within a Pset 715 communicate with the corresponding I/O node over a corresponding local I/O collective network 713A-C. The I/O nodes, in turn, are connected to functional network 705, over which they communicate with I/O devices attached to file servers 704, or with other system components. Thus, the local I/O collective networks 713 may be viewed logically as extensions of functional network 705, and like functional network 705 are used for data I/O, although they are physically separated from functional network 705. One example of the collective network is a tree network.

Control subsystem 702 directs the operation of the compute nodes 712 in compute core 701. Control subsystem 702 is a computer that includes a processor (or processors) 721, internal memory 722, and local storage 725. An attached console 707 may be used by a system administrator or similar person. Control subsystem 702 may also include an internal database which maintains state information for the compute nodes in core 701, and an application which may be configured to, among other things, control the allocation of hardware in compute core 701, direct the loading of data on compute nodes 711, and perform diagnostic and maintenance functions.

Control subsystem 702 communicates control and state information with the nodes of compute core 701 over control system network 706. Network 706 is coupled to a set of hardware controllers 708A-C. Each hardware controller communicates with the nodes of a respective Pset 715 over a corresponding local hardware control network 714A-C. The hardware controllers 708 and local hardware control networks 714 are logically an extension of control system network 706, although physically separate.

In addition to control subsystem 702, front-end nodes 703 provide computer systems used to perform auxiliary functions which, for efficiency or otherwise, are best performed outside compute core 701. Functions which involve substantial I/O operations are generally performed in the front-end nodes. For example, interactive data input, application code editing, or other user interface functions are generally handled by front-end nodes 703, as is application code compilation. Front-end nodes 703 are connected to functional network 705 and may communicate with file servers 704.

In one embodiment, the computer system 700 determines, from among a plurality of class route identifiers for each of the compute nodes along a communications path from a source compute node to a target compute node in the network, a class route identifier available for all of the compute nodes along the communications path. The computer system 700 configures network hardware of each compute node along the communications path with routing instructions in dependence upon the available class route identifier and a network topology for the network. The routing instructions for each compute node associate the available class route identifier with the network links between that compute node and each compute node adjacent to that compute node along the communications path. The source compute node transmits a network packet to the target compute node along the communications path, which includes encoding the available class route identifier in a network packet. The network hardware of each compute node along the communications path routes the network packet to the target compute node in dependence upon the routing instructions for the network hardware of each compute node and the available class route identifier encoded in the network packet. As used herein, the source compute node is a compute node attempting to transmit a network packet, while the target compute node is a compute node intended as a final recipient of the network packet.

In one embodiment, a class route identifier is an identifier that specifies a set of routing instructions for use by a compute node in routing a particular network packet in the network. When a compute node receives a network packet, the network hardware of the compute node identifies the class route identifier from the header of the packet and then routes the packet according to the routing instructions associated with that particular class route identifier. Accordingly, by using different class route identifiers, a compute node may route network packets using different sets of routing instructions. The number of class route identifiers that each compute node is capable of utilizing may be finite and may typically depend on the number of bits allocated for storing the class route identifier. An "available" class route identifier is a class route identifier that is not actively utilized by the network hardware of a compute node to route network packets. For example, a compute node may be capable of utilizing sixteen class route identifiers labeled 0-15 but only actively utilize class route identifiers 0 and 1. To deactivate the remaining class route identifiers, the compute node may disassociate each of the available class route identifiers with any routing instructions or maintain a list of the available class route identifiers in memory.

Routing instructions specify the manner in which a compute node routes packets for a particular class route identifier. Using different routing instructions for different class route identifiers, a compute node may route different packets according to different routing instructions. For example, for one class route identifier, a compute node may route packets specifying that class route identifier to a particular adjacent compute node. For another class route identifier, the compute node may route packets specifying that class route identifier to different adjacent compute node. In such a manner, two different routing configurations may exist among the same compute nodes on the same physical network.

Figure 8:
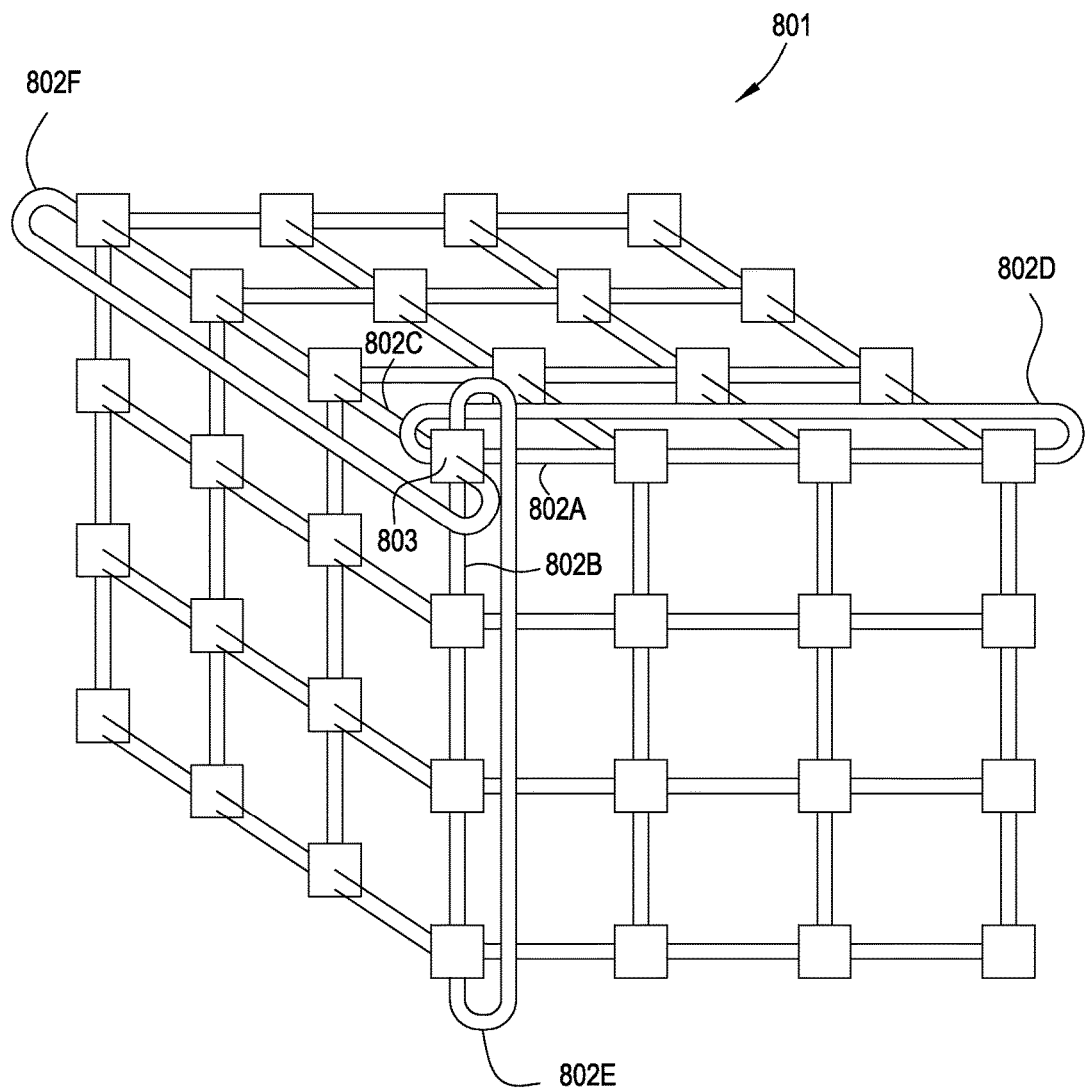
FIG. 8 is a conceptual illustration of a three-dimensional torus network of the large scale system, according to one embodiment.

In one embodiment, compute nodes 712 are arranged logically in a three-dimensional torus, where each compute node 712 may be identified using an x, y and z coordinate. FIG. 8 is a conceptual illustration of a three-dimensional torus network of system 700, according to one embodiment of the invention. More specifically, FIG. 8 illustrates a 4×4×4 torus 801 of compute nodes, in which the interior nodes are omitted for clarity. Although FIG. 8 shows a 4×4×4 torus having 64 nodes, it will be understood that the actual number of compute nodes in a parallel computing system is typically much larger. For example, a complete Blue Gene/L system includes 65,536 compute nodes. Each compute node 712 in torus 801 includes a set of six node-to-node communication links 802A-F which allows each compute nodes in torus 801 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 801, as shown in FIG. 8, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 8 by links 802D, 802E and 802F which wrap around from a last node in the x, y and z dimensions to a first node. Thus, although node 803 appears to be at a "corner" of the torus, node-to-node links 802A-F link node 803 to nodes 802D, 802E and 802F, in the x, y and z dimensions of torus 801.

Figure 9:
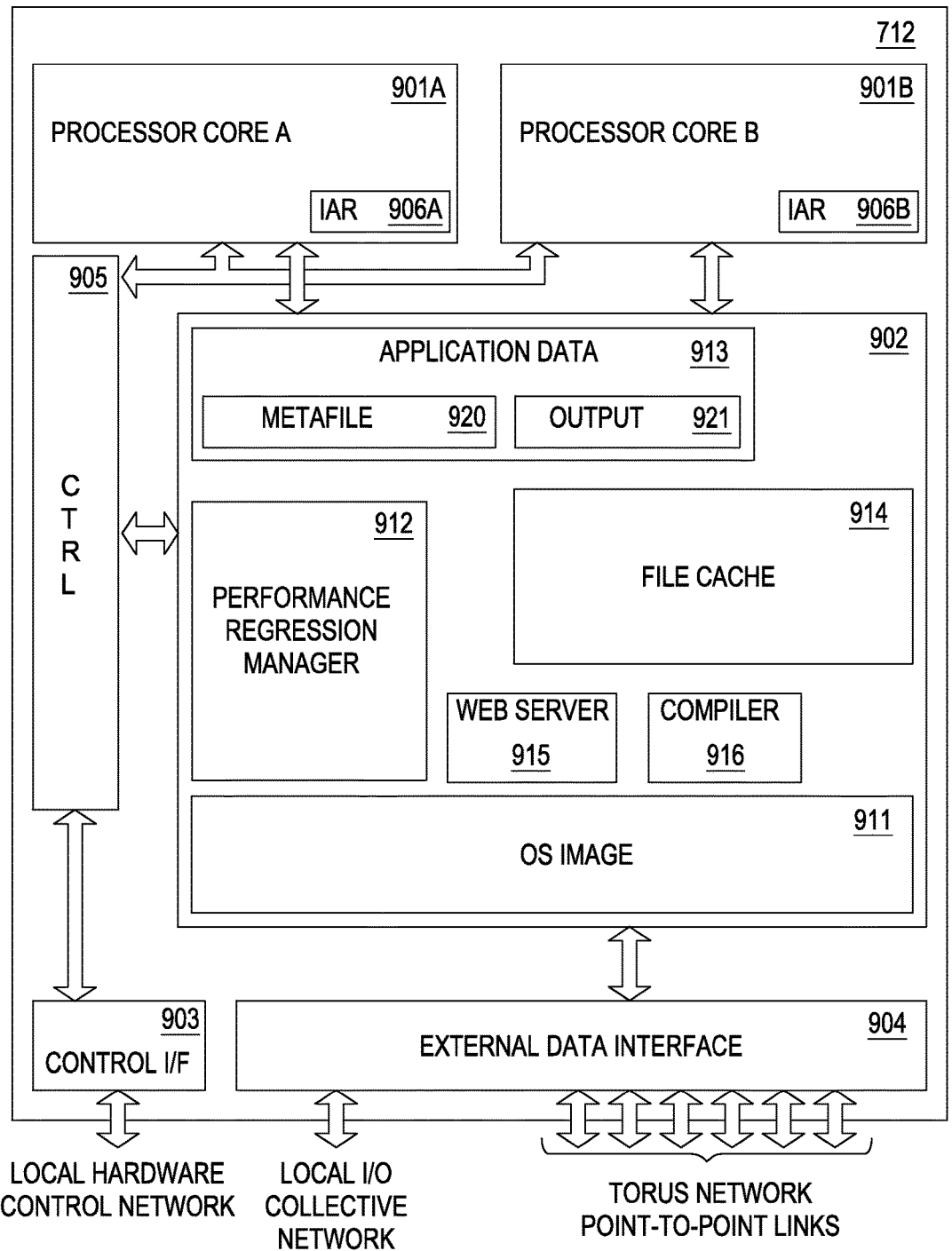
FIG. 9 is a diagram of a compute node of the large scale system, according to one embodiment of the invention.

FIG. 9 is a diagram of a compute node 712 of the system 700 of FIG. 7, according to one embodiment of the invention. As shown, compute node 712 includes processor cores 901A and 901B, and also includes memory 902 used by both processor cores 901; an external control interface 903 which is coupled to local hardware control network 714; an external data communications interface 904 which is coupled to the corresponding local I/O collective network 713, and the corresponding six node-to-node links 802 of the torus network 801; and monitoring and control logic 905 which receives and responds to control commands received through external control interface 903. Monitoring and control logic 905 may access processor cores 901 and locations in memory 902 on behalf of control subsystem 702 to read (or in some cases alter) the operational state of node 712. In one embodiment, each node 712 may be physically implemented as a single, discrete integrated circuit chip.

As described, functional network 705 may service many I/O nodes, and each I/O node is shared by multiple compute nodes 712. Thus, it is apparent that the I/O resources of parallel system 700 are relatively sparse when compared to computing resources. Although it is a general purpose computing machine, parallel system 700 is designed for maximum efficiency in applications which are computationally intense.

As shown in FIG. 9, memory 902 stores an operating system image 911, a performance regression manager 912, a web server 915, a compiler 916, and user application data structures 913 as required. The performance regression manager 912 is an application generally configured to perform a performance analysis between different execution instances of a computing task. The user application data structures 913 may include one or more metafiles 920 which include comparison rules used by the performance regression manager 912 to compare output data from the output 921. The output 921 may include raw results generated by executing a specific task, or set of tasks, as well as formatted output results generated by the performance regression manager 912. In one embodiment, the metafiles 920 and the output 921 are stored in disk-based storage 709A-B of file server 704. The web server 915 is a general purpose web server, while the compiler 916 is a general purpose compiler used to compile computer software. Some portion of memory 902 may be allocated as a file cache 914, i.e., a cache of data read from or to be written to an I/O file. Operating system image 911 provides a copy of a simplified-function operating system running on compute node 712. Operating system image 911 may includes a minimal set of functions required to support operation of the compute node 712. The performance regression manager 912 is an application generally configured to track the functional and performance status of quantifiable measures that are used to indicate the functional and performance quality of the parallel system 700 and the applications that execute thereon.

FIG. 10 illustrates components of the performance regression manager 912, according to one embodiment. As shown, the performance regression manager 912 includes a task execution component 1001, a user plugin component 1002, a performance rule analyzer 1003, a draw component 1004, and a commit component 1005. The task execution component 1001 is generally configured to trigger the execution of one or more tasks received as input by the performance regression manager 912. The task execution manager 1001 may issue concurrent PRM execute commands for different tasks onto a multi-rack system in order to speed its execution cycle, as the commands execute concurrently on each rack (and on a varying configuration of compute nodes in each rack). The task execution manager 1001 executes the input tasks, and prints the results to standard out/error while also storing the output to a file that is in a uniquely crated directory location specified (and tokenized) by the configuration label and stamped with the execution instance. The user plugin component 1002 accepts user-defined plugins used to post-process output generated by the task execution component 1001. The user plugin component 1002 outputs a file including metric data for the current execution instance in a format specified by the plugin, which facilitates comparison across execution instances, as all files generated by the user plugin component 1002 are formatted according to the format specified by each respective plugin.

The performance rule analyzer 1003 verifies performance of the current execution instance (or any combination of prior execution instances), by checking the metric values stored in the output generated by the user plugin component 1002. The performance rule analyzer 1003 utilizes the comparison rules stored in one or more metafiles in order to conduct the comparison between two or more datasets. The draw component 1004 provides numerous types of visualizations, such as tables or plots, to users who successfully created a processed output file by invoking the user plugin component 1002. In the table format, the draw component 1004 reads the files generated by the user plugin component 1002 and creates an HTML table that may be viewed using a web browser. The draw component 1004, in creating a plot, may call a plut utility specifying the curves (columns/metrics) to be plotted, logscale options, and titles. Users may also create their own visualization format so long as it is viewable and/or retrievable from a remote source. In one embodiment, the draw component 1004 stores the generated plots or tables in a plot directory of PRM's directory structure.

The commit component 1005 is responsible for transforming raw data generated by the task execution manager 1001 into a well-organized format that is accessible by different users, as well as carrying out internal processes needed for creating first-time performance comparisons. The commit component 1005 receives the name of the benchmarking suite (typically the first substring of a configuration) and an execution instance. If the user requires performance comparisons, the commit component 1005 also receives a metafile to carry out initial performance analysis, and configure internal comparison rules for each of the different configurations specified by the metafile. The commit component 1005 is invoked upon execution of all configurations under a given application.

Advantageously, embodiments disclosed herein allow users to compare the performance of different execution instances of software based on any user-defined metric. This provides a large reduction in the amount of time spent on software build analysis, allowing users to easily visualize the results of metric comparisons generated on-demand and on-the-fly. Users can create plugins which define the metrics for comparison, as well as a standard format for outputting metric values detected in standard execution output. The formatted metric values of two or more execution instances may then be compared based on rules stored in one or more performance metafiles, and a visualization of the comparison results may be displayed to the user.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications, such as the performance regression manager or related data available in the cloud. For example, the performance regression manager could execute on a computing system in the cloud and perform a comparison of metric data generated by multiple software execution instances. In such a case, the performance regression manager could perform the metric comparison and comparison results at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A parallel computing system, comprising:
one or more computer processors; and
a memory containing a program, which, when executed by the one or more computer processors, performs an operation comprising:
receiving, by a user-defined plugin specifying a plurality of performance metrics and a first output file format, a first output generated by a first execution instance of a first command;
generating, by the user-defined plugin applied to the first output, a first output file specifying a respective value of each of the plurality of performance metrics, wherein a first metric of the plurality of metrics relates to a first network route identified by a first class route identifier, wherein the first network route is of a plurality of network routes in a network, wherein the first network route connects a first compute node and a second compute node in the parallel computing system;
comparing each value in the first output file to a respective value for each of the plurality of performance metrics in a second output file, the second output file having been generated by the user-defined plugin based on a second output generated by a second execution instance of the first command, wherein the values of the plurality of performance metrics of the first output file and the values of the plurality of performance metrics of the second output file are formatted according to the first output file format to facilitate comparison across execution instances of the first command; and
outputting an indication of a result of the comparison.

2. The parallel computing system of claim 1, wherein the user-defined plugin generates a third output file and a fourth output file for a first execution instance and a second execution instance, respectively, of a second command, wherein the values in the first output file specify a respective level of use of a respective system resource, of a plurality of system resources of the parallel computing system, experienced by executing the first execution instance of the first command on the parallel computing system, wherein the third and fourth output files are formatted according to the first output file format.

3. The parallel computing system of claim 2, the operation further comprising:
comparing each of the values in the third output file to a respective value for each of the plurality of performance metrics in the fourth output file; and
outputting an indication of a result of the comparison of the values of the third output file to the values of the fourth output file.

4. The parallel computing system of claim 1, wherein the user-defined plugin further specifies a format for the indication of the result of the comparison, wherein the format specifies at least one of: (i) a plot, (ii) a table, and (iii) a webpage.

5. The parallel computing system of claim 1, wherein the comparing is based on a plurality of comparison rules, wherein each of the plurality of comparison rules specifies a respective operator used to compare the respective values for each of the performance metrics of the first output file and the second output file.

6. The parallel computing system of claim 5, wherein the plurality of comparison rules are specified in a user-defined performance metafile, wherein the performance metafile further specifies: (i) a target execution instance, (ii) a data point for comparison, (iii) a comparison operator, (iv) a base execution instance, (v) a comparison threshold, and (vi) an annotation.

7. The parallel computing system of claim 1, wherein the plurality of performance metrics includes each of (i) a bandwidth, (ii) a latency, and (iii) a throughput of the first network route, wherein the first class route identifier is of a plurality of class route identifiers, wherein the first network route is of a plurality of network routes in the parallel computing system, wherein each of the plurality of network routes is identified by a respective one of the plurality of class route identifiers.

8. The parallel computing system of claim 1, the operation further comprising:
comparing each of the values in the first output file to a respective value for each of the plurality of performance metrics in a third output file, the third output file having been generated according to the first output file format based on a third output generated by a third execution instance of the first command; and
outputting for display an indication of a result of the comparison of the values of the first output file to the respective values of the third output file.

9. A computer program product, comprising:
a non-transitory computer-readable storage medium having computer-readable program code embodied therewith, the computer-readable program code executable to perform an operation comprising:
receiving, by a user-defined plugin specifying a plurality of performance metrics and a first output file format, a first output generated by a first execution instance of a first command;
generating, by the user-defined plugin applied to the first output, a first output file specifying a respective value of each of the plurality of performance metrics, wherein a first metric of the plurality of metrics relates to a first network route identified by a first class route identifier, wherein the first network route is of a plurality of network routes in a network, wherein the first network route connects a first compute node and a second compute node in a parallel computing system;
comparing each value in the first output file to a respective value for each of the plurality of performance metrics in a second output file, the second output file having been generated by the user-defined plugin based on a second output generated by a second execution instance of the first command, wherein the values of the plurality of performance metrics of the first output file and the values of the plurality of performance metrics of the second output file are formatted according to the first output file format to facilitate comparison across execution instances of the first command; and
outputting an indication of a result of the comparison.

10. The computer program product of claim 9, wherein the user-defined plugin generates a third output file and a fourth output file for a first execution instance and a second execution instance, respectively, of a second command, wherein the values in the first output file specify a respective level of use of a respective system resource, of a plurality of system resources of the parallel computing system, experienced by executing the first execution instance of the first command on the parallel computing system, wherein the third and fourth output files are formatted according to the first output file format.

11. The computer program product of claim 10, the operation further comprising:
comparing each of the values in the third output file to a respective value for each of the plurality of performance metrics in the fourth output file; and
outputting an indication of a result of the comparison of the values of the third output file to the values of the fourth output file.

12. The computer program product of claim 9, wherein the user-defined plugin further specifies a format for the indication of the result of the comparison, wherein the format specifies at least one of: (i) a plot, (ii) a table, and (iii) a webpage.

13. The computer program product of claim 9, wherein the comparing is based on a plurality of comparison rules, wherein each of the plurality of comparison rules specifies a respective operator used to compare the respective values for each of the performance metrics of the first output file and the second output file.

14. The computer program product of claim 13, wherein the plurality of comparison rules are specified in a user-defined performance metafile, wherein the performance metafile further specifies: (i) a target execution instance, (ii) a data point for comparison, (iii) a comparison operator, (iv) a base execution instance, (v) a comparison threshold, and (vi) an annotation.

15. The computer program product of claim 9, wherein the plurality of performance metrics includes each of: (i) a bandwidth, (ii) a latency, and (iii) a throughput of the first network route, wherein the first class route identifier is of a plurality of class route identifiers, wherein the first network route is of a plurality of network routes in the parallel computing system, wherein each of the plurality of network routes is identified by a respective one of the plurality of class route identifiers.

16. The computer program product of claim 9, the operation further comprising:
comparing each of the values in the first output file to a respective value for each of the plurality of performance metrics in a third output file, the third output file having been generated according to the first output file format based on a third output generated by a third execution instance of the first command; and
outputting for display an indication of a result of the comparison of the values of the first output file to the respective values of the third output file.

17. A method, comprising:
receiving, by a user-defined plugin specifying a plurality of performance metrics and a first output file format, a first output generated by a first execution instance of a first command;
generating, by the user-defined plugin applied to the first output, a first output file specifying a respective value of each of the plurality of performance metrics, wherein a first metric of the plurality of metrics relates to a first network route identified by a first class route identifier, wherein the first network route is of a plurality of network routes in a network, wherein the first network route connects a first compute node and a second compute node in a parallel computing system;
comparing each value in the first output file to a respective value for each of the plurality of performance metrics in a second output file, the second output file having been generated by the user-defined plugin based on a second output generated by a second execution instance of the first command, wherein the values of the plurality of performance metrics of the first output file and the values of the plurality of performance metrics of the second output file are formatted according to the first output file format to facilitate comparison across execution instances of the first command; and
outputting an indication of a result of the comparison.

18. The method of claim 17, wherein the user-defined plugin generates a third output file and a fourth output file for a first execution instance and a second execution instance, respectively, of a second command, wherein the values in the first output file specify a respective level of use of a respective system resource, of a plurality of system resources of the parallel computing system, experienced by executing the first execution instance of the first command on the parallel computing system, wherein the third and fourth output files are formatted according to the first output file format, wherein the user-defined plugin further specifies a format for the indication of the result of the comparison, wherein the format specifies at least one of: (i) a plot, (ii) a table, and (iii) a webpage.

19. The method of claim 17, wherein the comparing is based on a plurality of comparison rules, wherein each of the plurality of comparison rules specifies a respective operator used to compare the respective values for each of the performance metrics of the first output file and the second output file, wherein the plurality of comparison rules are specified in a user-defined performance metafile, wherein the performance metafile further specifies: (i) a target execution instance, (ii) a data point for comparison, (iii) a comparison operator, (iv) a base execution instance, (v) a comparison threshold, and (vi) an annotation.

* * * * *